US011494840B2

(12) United States Patent
Benson

(10) Patent No.: US 11,494,840 B2
(45) Date of Patent: Nov. 8, 2022

(54) SYSTEM AND METHOD FOR BUYING AND SELLING STOCKS, FRACTIONAL SHARES, SHARES, COMMODITIES, AND OTHER PRODUCTS LISTED ON ANY STOCK EXCHANGE

(71) Applicant: John Arthur Benson, Arlington, TX (US)

(72) Inventor: John Arthur Benson, Arlington, TX (US)

(*) Notice: Subject to any disclaimer, the term of this patent is extended or adjusted under 35 U.S.C. 154(b) by 131 days.

(21) Appl. No.: 16/698,712

(22) Filed: Nov. 27, 2019

(65) Prior Publication Data

US 2021/0110472 A1  Apr. 15, 2021

Related U.S. Application Data

(60) Provisional application No. 62/973,629, filed on Oct. 15, 2019, provisional application No. 62/939,983, filed on Nov. 25, 2019.

(51) Int. Cl.
*G06Q 40/04* (2012.01)
*G06Q 20/18* (2012.01)
*G06Q 20/20* (2012.01)
*G06Q 20/34* (2012.01)
*G06Q 30/06* (2012.01)
*G06Q 10/10* (2012.01)

(52) U.S. Cl.
CPC ............ *G06Q 40/04* (2013.01); *G06Q 20/18* (2013.01); *G06Q 20/209* (2013.01); *G06Q 20/342* (2013.01); *G06Q 20/347* (2013.01); *G06Q 30/0641* (2013.01); *G06Q 10/107* (2013.01)

(58) Field of Classification Search
CPC .... G06Q 20/209; G06Q 20/18; G06Q 20/342; G06Q 40/04; G06Q 10/107; G06Q 20/347; G06Q 30/0641; G06Q 20/20; G06Q 30/06; G06Q 20/34
USPC .......................................................... 705/24
See application file for complete search history.

(56) References Cited

U.S. PATENT DOCUMENTS 9,148,284 B2 * 9/2015 Vantaggiato ........ H04W 12/068
9,227,800 B2 * 1/2016 Martin ................. G06Q 20/347
(Continued)

FOREIGN PATENT DOCUMENTS

WO    WO 2016115267   *   7/2016   ............. G06Q 40/00

*Primary Examiner* — Andrew Joseph Rudy
(74) *Attorney, Agent, or Firm* — Leavitt Eldredge Law Firm

(57) ABSTRACT

An automated system and method for BUYING AND SELLING STOCKS, FRACTIONAL SHARES, SHARES, COMMODITIES, OR ANY OTHER PRODUCT LISTED ON ANY US OR GLOBAL STOCK EXCHANGES through a kiosk of debit card, credit card, or gift card. The kiosk having a housing to house electrical, network, and communication components; a user interface in communication with the kiosk, the user interface to receive user commands; the kiosk being managed and operated by an investment entity, the investment entity having the ability to buy or sell the one or more investments; and a gift card; the one or more investments include one or more stocks, fractional shares, shares, commodities, or any other product listed on any US or global stock exchanges; and the one or more user commands allow the user to purchase or sell the one or more investments via the kiosk.

7 Claims, 6 Drawing Sheets

(56) References Cited

U.S. PATENT DOCUMENTS

| | | | | |
|---|---|---|---|---|
| 9,679,287 B2* | 6/2017 | Curtis | ............... | G06Q 30/0623 |
| 10,460,311 B2* | 10/2019 | Curtis | ............... | G06Q 20/348 |
| 10,572,946 B2* | 2/2020 | Bowles | ............... | G06Q 30/0278 |
| 10,608,820 B2* | 3/2020 | Pirrwitz | ............... | H04L 9/3228 |
| 11,100,744 B2* | 8/2021 | Yahn | ............... | G07F 17/26 |
| 2009/0283587 A1* | 11/2009 | DiBello | ............... | G06Q 20/04 |
| | | | | 235/380 |
| 2010/0114783 A1* | 5/2010 | Spolar | ............... | G06Q 50/188 |
| | | | | 705/26.1 |
| 2010/0332356 A1* | 12/2010 | Spolar | ............... | G06Q 30/0601 |
| | | | | 705/26.1 |
| 2013/0117174 A1* | 5/2013 | Cole | ............... | G06Q 40/02 |
| | | | | 705/39 |
| 2013/0221653 A1* | 8/2013 | Powell | ............... | G06Q 20/387 |
| | | | | 283/79 |
| 2016/0012465 A1* | 1/2016 | Sharp | ............... | G06Q 20/386 |
| | | | | 705/14.17 |
| 2018/0365667 A1* | 12/2018 | Glass | ............... | G06Q 20/18 |
| 2019/0035024 A1* | 1/2019 | Khadir | ............... | G06Q 40/06 |

\* cited by examiner

Thank you for purchase. Your confirmation number is XXXXXXXXXX.

You will receive a text and/or email with details related to this transaction. Once the fractional shares, shares, stock or other commodity is purchased, you will receive a text and/or email with details of that purchase and you may view the details by logging into your account on the web site www.XXXXXX.com

Summary
Company name : XXXXXXXX
Plan name : Direct Stock Plan
Holder Name : Jane Doe
Date of Transaction (Today's Date) : XX/XX/XXXX
Card Number : Last 4 digits of card # used XXXX
Investment Amount : $XXXX

FIG. 3

SYSTEM AND METHOD FOR BUYING AND SELLING STOCKS, FRACTIONAL SHARES, SHARES, COMMODITIES, AND OTHER PRODUCTS LISTED ON ANY STOCK EXCHANGE

BACKGROUND

1. Field of the Invention

The present invention relates generally to investment systems, and more specifically, to an investment system that includes a kiosk that allows for users to purchase and sell investments, such as stocks, fractional shares, shares, commodities, and any other products listed in U.S. or global stock exchanges.

2. Description of Related Art

Investment systems are well known in the art and are effective means to allow individuals to purchase and sell investments. For example, FIG. 1 depicts a flowchart 101 of a conventional method, wherein a user may first create a brokerage account, as shown with box 103. The user will then browse, research, and select a stock as well as a number of shares they desire to purchase, as shown with box 105. The user will complete payment, such as through an online system, to complete the purchase, as shown with box 107. As desired, the user will then monitor and/or sell shares, as shown with box 109.

One of the problems commonly associated with method 101 is that these methods do not reach a large part of the US and world population. Today, approximately 50% of Americans are not invested in the stock market. This is often because they find conventional methods intimidating, time consuming and complicated. Within that population there is a large group of people who will not use the internet or apps to shop or to make financial transactions.

Accordingly, it is an objective of the present invention to provide for a system that allows users with a new way to invest. The invention of the present application is directed to an automated system and method for buying and selling stocks, fractional shares, commodities, or any other products listed in any US or global stock exchange without the need to download a mobile application, go to a bank or brokerage firm, or utilize other investment services. The system of the present invention allows users easy access to buy investments and investment gift cards through utilization of a kiosk or other similar stand alone equipment that is associated with an investment entity.

The system of the present invention allows for the investment entity to manage an associated kiosk, wherein the investment entity would follow investment entity policies, procedures, and timelines for carrying out transactions, as well as implement institutional guidelines, rules, and regulations governing any stock exchange.

Accordingly, although great strides have been made in the area of investment systems, many shortcomings remain. The objective of this invention is not only to attract the large percentage of people who do not invest in the stock market but also the large group of people within that percentage who will not use brokerage firms, websites, and/or apps.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 3 is an example of a receipt/confirmation of transaction associated with the system of FIG. 2;

Figure 1:
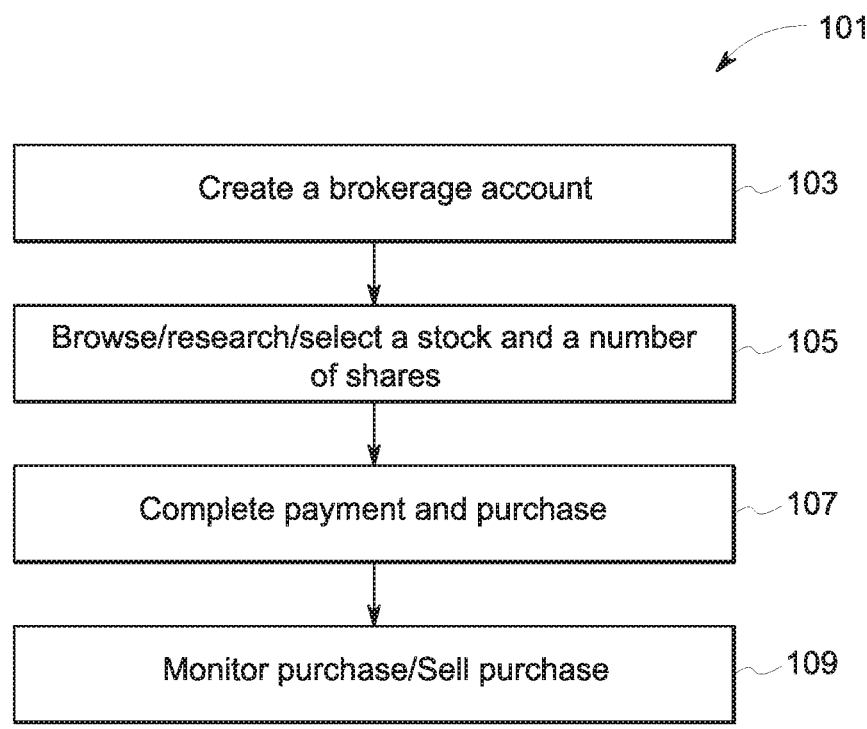
FIG. 1 is a flowchart of a conventional investment system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional investment systems. Specifically, the present invention provides for a convenient kiosk associated with an investment entity, wherein users can easily purchase and sell investments through the kiosk. In addition, the system provides for the ability to purchase and redeem gift cards for use in purchasing investments. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
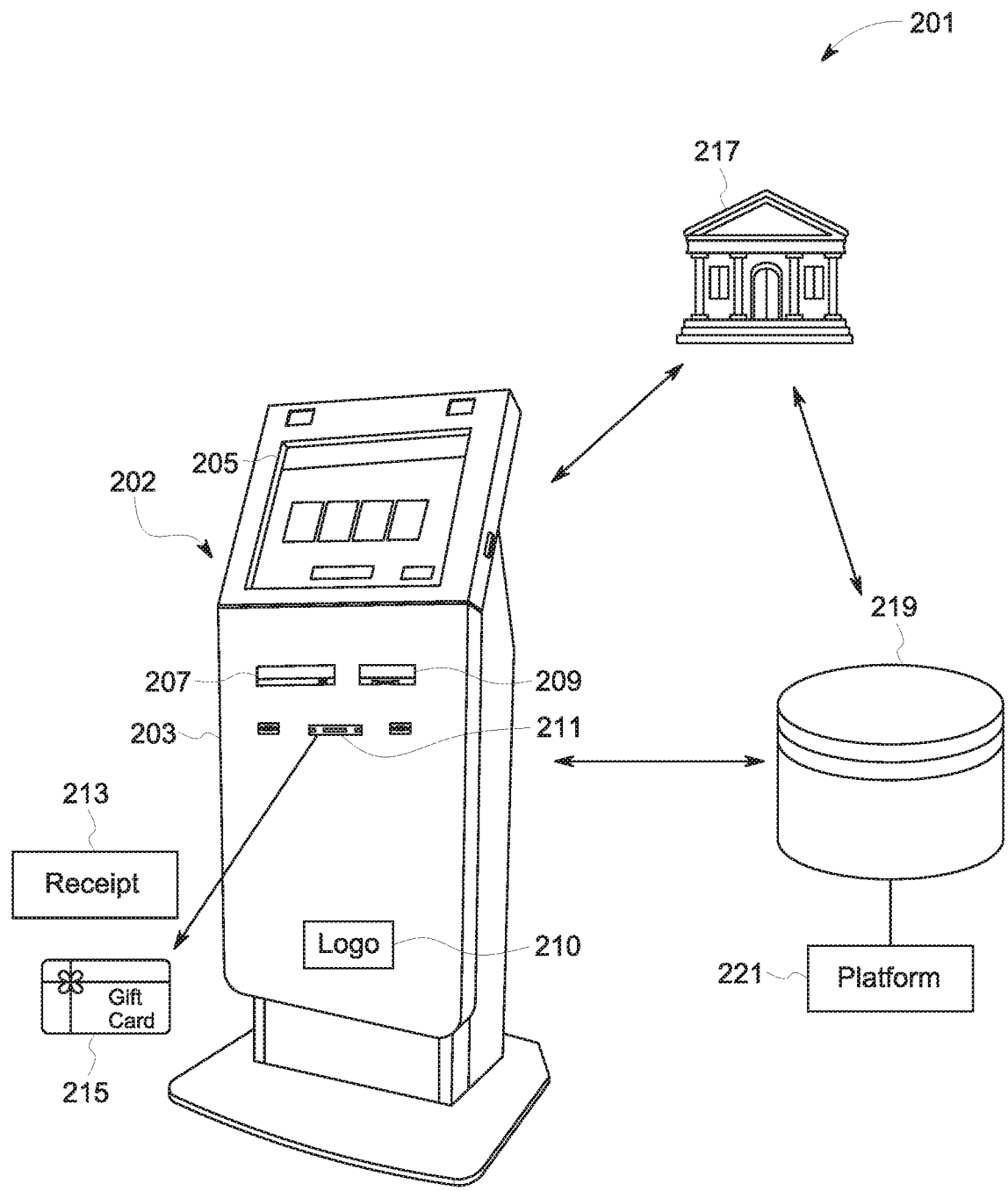
FIG. 2 is a schematic of an investment system in accordance with a preferred embodiment of the present application.

Referring now to the drawings wherein like reference characters identify corresponding or similar elements throughout the several views, FIG. 2 depicts a schematic of an investment system 201 in accordance with a preferred embodiment of the present application. It will be appreciated that system 201 overcomes one or more of the above-listed problems commonly associated with conventional investment systems. It should be appreciated and understood that herein, the term "investment" can refer to any purchase, such as stock, fractional shares, shares, commodities, and any other products listed in U.S. or global stock exchanges.

In the contemplated embodiment, system 201 includes a kiosk 202, the kiosk 202 being able to vary in structural features, such as being a standalone device, incorporated into other devices, connected to a building, or the like. The kiosk 202 includes a housing 203 configured to house electrical components as will be discussed herein, the electrical components allowing for communication, data retrieval, data processing, and the like.

As shown, kiosk 202 includes a user interface 205 which can be a keypad, a touch screen, or any other known interface that allows for receiving and processing of user commands. In addition, kiosk 202 includes a card reader 209 which can be configured to accept credit cards, debit cards, gift cards, and the like. Yet further, kiosk 202 can include a scanner 207, wherein the scanner may be utilized to scan a code or the like, such as for an investment sale. The kiosk further having a printer 211, wherein the printer 211 can be configured to print a receipt/confirmation of transaction 213 or gift card 215 as will be discussed in more detail herein.

As shown, in the preferred embodiment, the kiosk 202 is associated with and controlled by an investment entity 217, wherein the investment entity 217 manages investments purchased and sold via kiosk 202.

Yet further, in some embodiments, it is contemplated that system 201 can include a data repository 219 managed by the investment entity, wherein the data repository 219 is configured to allow for a user to monitor investments, through the kiosk. It is contemplated that the platform 221 can be a website, wherein the user will log onto the website and receive information associated with their investment. Further, the platform 221 can include an email, wherein the user receives updates and confirmations associated with their purchase.

During use, a user will utilize a kiosk 202 to make a selection of an investment to purchase, wherein the kiosk will process the commands from the user to create the investment purchase. The user will then proceed with payment for the investment, thereby generating the sale, wherein the user will then receive a receipt/confirmation of transaction 213 to show and display the sale of the investment. Further, it should be appreciated that the system can function in reverse wherein the user will utilize the kiosk for selling of an investment.

In some embodiments, the user can further utilize the kiosk to purchase a gift card 215, wherein the kiosk will immediately provide the user with the gift card. The gift card then being redeemable by a secondary user to purchase an investment. It should further be appreciated that the gift card can alternatively be purchased from a third-party retail location.

In some embodiments, a company might want to have their own kiosk with their company logo 210. A kiosk could be configured to sell only the stock of that company and branded with that company logo if desired. The logo 210 being displayed on the kiosk and thereby advertising the company.

It should be appreciated that one of the unique features believed characteristic of the present application is the inclusion of a kiosk associated with an investment entity, wherein the user can merely utilize the kiosk to purchase investments.

In FIG. 3, a simplified example of an embodiment of a receipt/confirmation of transaction 213 is shown. It should be appreciated that the receipt 213 can be in a variety of forms. In this embodiment, a receipt is shown with a confirmation number 301, to be utilized to bring up information on a website 303, as well as a summary 305 of the purchase.

Figure 4:
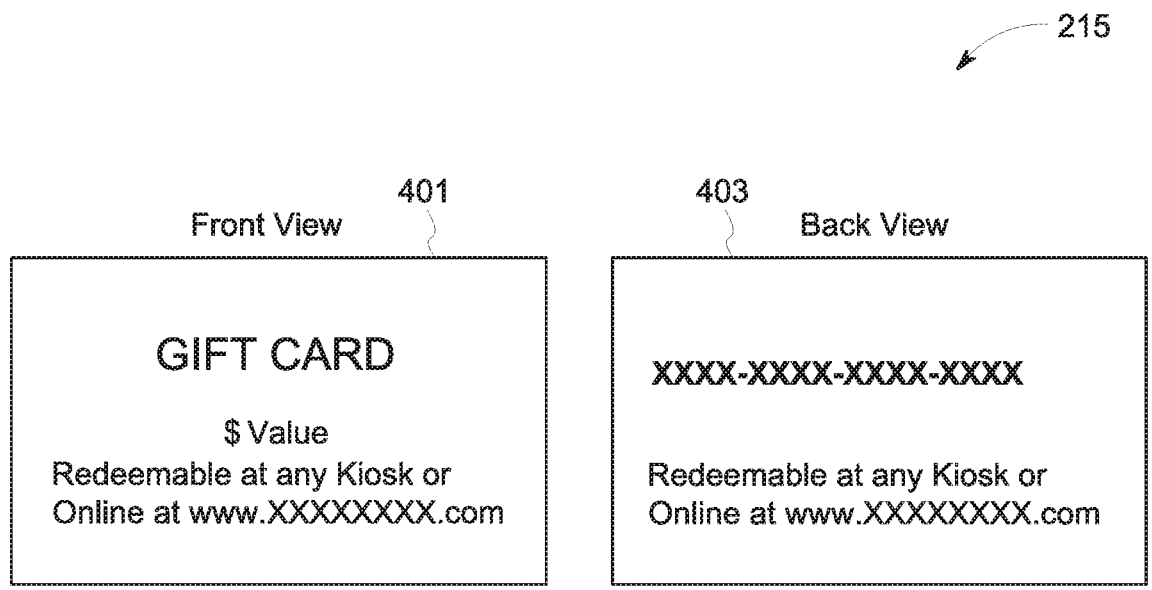
FIG. 4 is an example of a gift card associated with the system of FIG. 2.

In FIG. 4, a simplified example of an embodiment of a gift card 215 is shown. It should again be appreciated that the gift card can vary in style, information, and aesthetical features as desired. As shown, in this embodiment, the gift card includes a front 401 having information including a value, instructions for redeeming, and a website. A back 403 can include a gift card number, as well as directions and a website.

Figure 5:
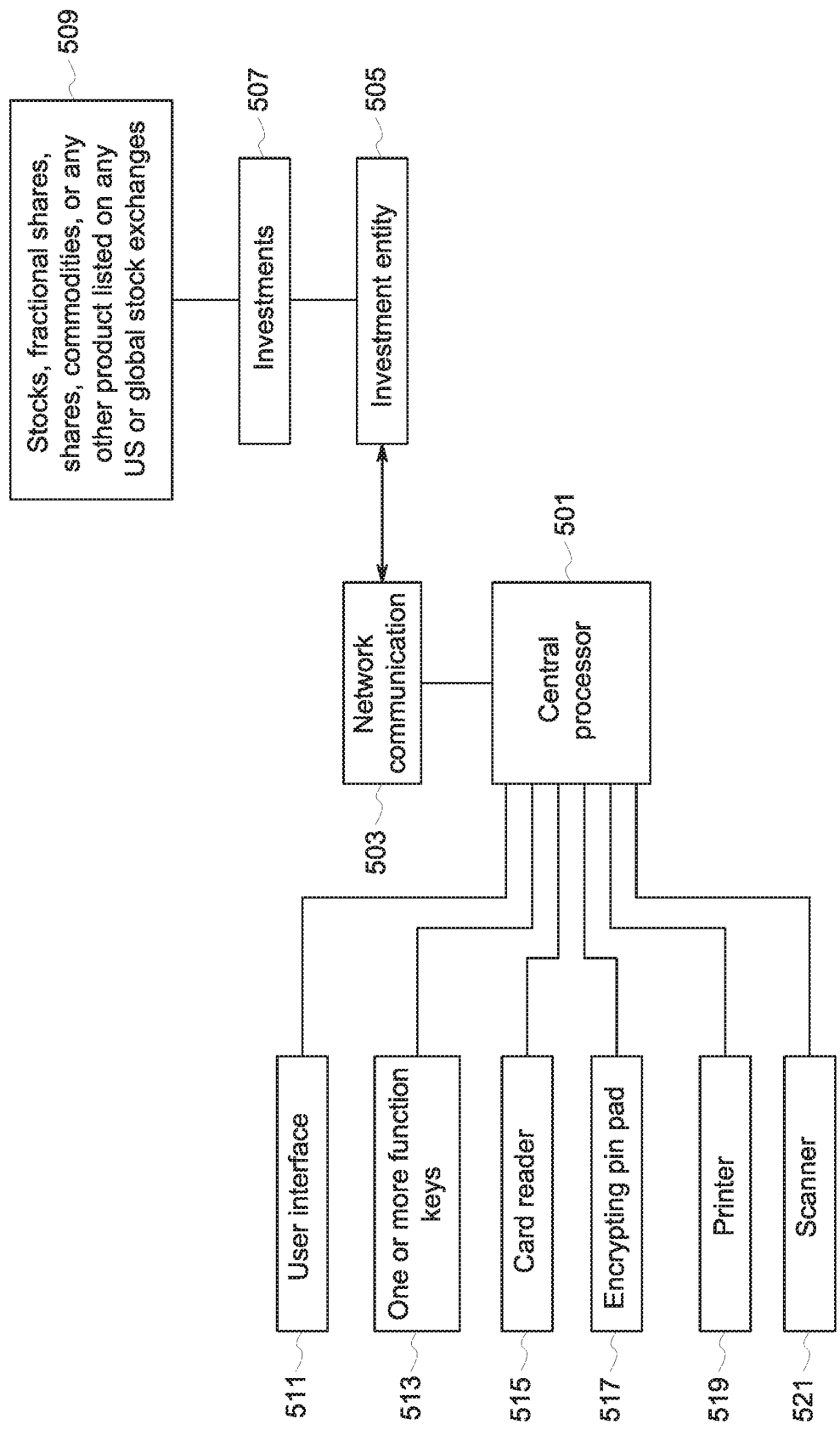
FIG. 5 is a schematic of some of the elements of a kiosk of FIG. 2.

In FIG. 5, a schematic depicts some of the features that could be associated with a kiosk in accordance with the present invention. As shown, the kiosk will have some form of central processor 501, the central processor configured to receive and process commands. The central processor 501 will have a network communication feature 503 that allows for the receiving and transmitting of information between the kiosk and the investment entity 505, wherein the investment entity 505 controls investments 507, including stock, fractional shares, shares, commodities, and any other products listed in U.S. or global stock exchanges 509.

Yet further, the central processor 501 will receive commands and provide commands with other components, such as a user interface 511, one or more function keys 513, a card reader 515, an encrypting pin pad 517, a printer 519, and a scanner 521.

Figure 6:
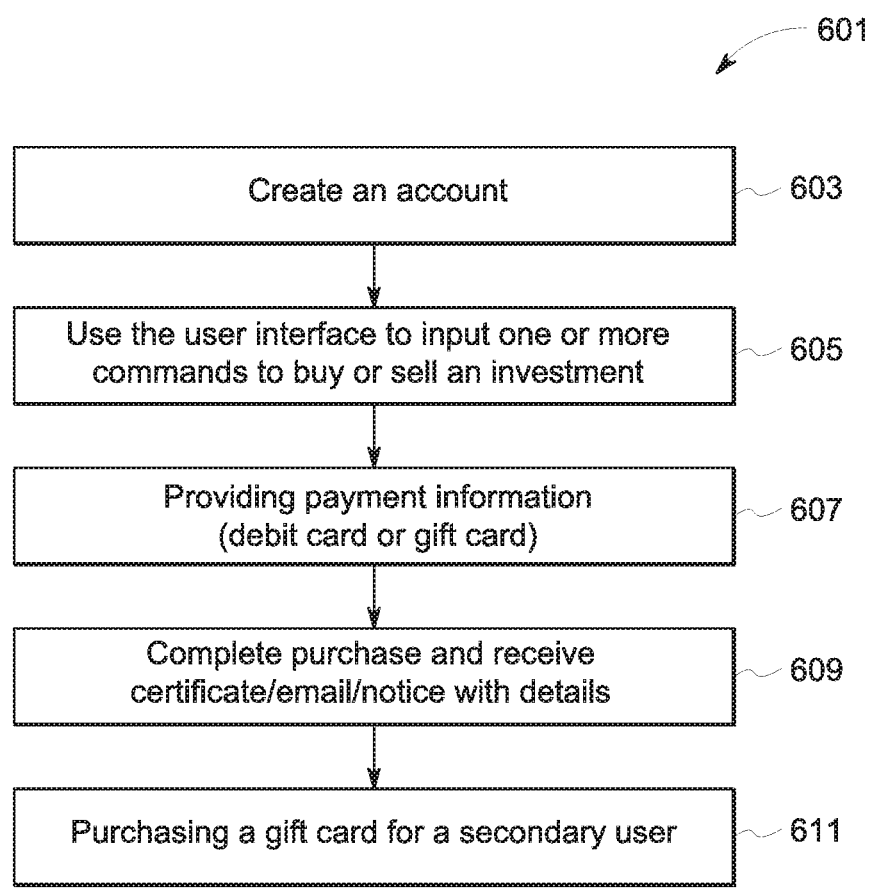
FIG. 6 is a flowchart of a method of use of the system of FIG. 2.

In FIG. 6, a flowchart 601 depicts a method of use of system 201. During use, a user will create an account, as shown with box 603. It should be appreciated that the user may utilize the kiosk, a platform, or the investment entity directly to create a profile. The user will then utilize the user interface to input one or more commands to either buy or sell an investment, as shown with box 605. This step will require the user to select a type of investment, perhaps a number of shares, or the like. Once the details are established, if the user is purchasing the investment, they will provide payment information, such as a credit card, debit card, or gift card, as shown with box 607. Should the user desire to sell an investment, the user may have choices such as to receive a check, application of credit to the user's account, or to their bank account, or credit to a card/gift card.

The purchase is then completed, wherein the user receives confirmation, such as a printed receipt, text message, and/or email notification, as shown with box 609. In some embodiments, and as desired, the user may utilize the kiosk to purchase a gift card for a secondary user, as shown with box 611.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A system for purchasing one or more investments, the system comprising:
   a kiosk having a housing configured to house electrical, network, and communication components;
   a user interface in communication with the kiosk, the user interface configured to receive one or more user commands to complete a first purchase of the one or more investments through the kiosk;
   the kiosk being operated and managed by an investment entity through the network, the investment entity having control over the first purchase and any subsequent purchases or sales of the one or more investments;
   a gift card, the gift card purchased from the kiosk and configured to communicate with the kiosk as a method of payment to complete a second purchase of a second one or more investments by a gift card receiver;
   a confirmation associated with the first purchase, the confirmation having a confirmation number printed thereon and a summary of the first purchase;
   a platform being accessible from a computing device and in communication with a data repository, wherein the confirmation number is used to bring up information associated with the first purchase via the computing device, the computing device being a separate entity from the kiosk;
   wherein the one or more investments consists essentially of one or more stocks, fractional shares, shares, commodities, or any other product listed on any United States or global stock exchanges.

2. The system of claim 1, wherein the gift card is purchased from the kiosk by redeeming the one or more investments.

3. The system of claim 1, wherein the gift card is purchased from a third-party retailer and redeemable only for the purchase of one or more investments through the kiosk.

4. The system of claim 1, further comprising:
   a receipt of a transaction issued from the kiosk, the receipt having information associated with the purchase including the confirmation number;
   the information associated with the purchase including a company name, a plan name, a holder name, a date of the transaction, a card number associated with the purchase, and an investment amount.

5. A method of purchasing one or more investments, the method comprising:
   providing a kiosk having a housing to house electrical, network, and communication components, the kiosk being under control from an investment entity, the investment entity further having control over the one or more investments;
   providing a user interface in communication with the kiosk, the user interface to receive one or more user commands from a user;
   allowing the user to create a profile;
   retrieving the profile from the user on the interface;
   providing the user with one or more selections on the user interface to select an investment for a purchase;
   providing a payment method to the kiosk to complete the purchase of the one or investment;
   completing the purchase of the investment based on the one or more selections from the user;
   generating a receipt associated with the purchase, the receipt providing a confirmation number printed thereon and a summary of the purchase;
   providing a gift card purchase option to the user through the user interface;
   completing a gift card purchase based on one or more commands from the user through the user interface;
   printing a gift card via the kiosk for the user;
   receiving the gift card via the kiosk by a second user, the second user redeeming the gift card for a second purchase of a second investment for the second user.

6. The method of claim 5, wherein the payment method is the gift card, or a debit card, or a credit card.

7. The method of claim 5, further comprising:
   receiving information associated with the purchase via the profile accessing a data repository.

* * * * *